United States Patent Office 3,629,454
Patented Dec. 21, 1971

3,629,454
AN ANTIFUNGAL AND ANTIBACTERIAL COMPOSITION
Fred S. Barr and Charles F. Bullock, Bristol, Va., and Galen F. Collins, Bristol, Tenn., assignors to The S. E. Massengill Company, Bristol, Tenn.
No Drawing. Continuation-in-part of abandoned application Ser. No. 296,359, July 19, 1963. This application June 4, 1968, Ser. No. 734,207
Int. Cl. A01n *9/02;* A61k *27/00*
U.S. Cl. 424—320          7 Claims

ABSTRACT OF THE DISCLOSURE

This invention relates to new and synergistic antimicrobial compositions which comprise the diethanolamide of a higher saturated fatty acid, e.g. lauric diethanolamide, which itself has substantially no antimicrobial activity, plus a known antimicrobial agent such as sodium bithionolate, a resulting composition being much more effective than either of the components alone or the expected additive effect of the components.

CROSS REFERENCE TO RELATED APPLICATION

This application is a continuation-in-part of our copending application Ser. No. 296,359, filed July 19, 1963, for "Antimicrobial Composition," now abandoned.

BACKGROUND OF THE INVENTION

It is well known that when antimicrobial agents are mixed three possiblities exist with respect to the mixture. In most cases the effect of the mixture is the additive or expected effect of each of the components thereof. In some few cases the mixture actually has less of an action against the microorganisms than either of the components used alone. In equally few cases the mixture may have a synergistic or potentiated action, that is the action of the mixture is greater than the sum of the actions of the individual components of the mixture. Synergistic mixtures of agents are desirable but extremely difficult to find.

SUMMARY OF THE INVENTION

Generally speaking, in accordance with the present invention, a composition is provided of the diethanolamide of a higher saturated fatty acid, which itself has substantially no antimicrobial action, where only a minimum antimicrobial action, plus a known antimicrobial agent from the group of sodium bithionolate, the zinc salt of 1 - hydroxy - 2 - pyridinethione, hexachlorophene and parachlorometaxylenol. The ratio of the components in the composition is preferably maintained at between about 0.15 to 10 parts of the higher fatty acid diethanolamide per each part of the antimicrobial agent such as sodium bithionolate.

It is accordingly a primary object of the present invention to provide new antimicrobial compositions which are highly effective against many types of microorganisms.

It is yet another object of the present invention to provide new antimicrobial compositions in which the normal antimicrobial activity of certain known antimicrobial agents is so greatly potentiated that lesser amounts of the agents can be used to achieve a satisfactory antimicrobial action.

It is still another object of the present invention to provide antimicrobial compositions that can be used for various antimicrobial purposes; for example, in the form of veterinary shampoos, etc.

Other objects and advantages of the present invention will be apparent from a further reading of the specification and of the appended claims.

It is noted that sodium bithionol is also known as sodium bithionolate, which is the non-proprietary name, the chemical name being disodium 2,2'-thiobis-(4,6-dichlorophenol).

It has been found, according to the present invention, that the higher fatty acid diethanolamides, particularly the diethanolamides of fatty acids of ten or more carbon atoms, more particularly the diethanolamides of caproic acid, lauric acid, palmitic acid, myristic acid and stearic acid, and most preferably lauric diethanolamide, which, themselves, have substantially no antimicrobial activity, when mixed with certain antimicrobial agents, namely those mentioned above, tremendously potentiate the activity of these antimicrobial agents.

Thus, for example, the antimicrobial activity of sodium bithionolate against *C. albicans* is increased five-fold by the presence of lauric diethanolamide which has substantially no activity against *C. albicans*, and the activity of sodium bithionolate against *S. aureus* is increased three-fold by the presence of lauric diethanolamide, which itself has substantially no activity against *S. aureus*. Since these two organisms are the cause of many infections, it is apparent that the compositions of the present invention provide an enormous advance in the art of antimicrobial treatment.

It is noted that the higher fatty acid diethanolamide, of which lauric diethanolamide is the most preferred, and for simplicity the further discuission in this case will be with respect to lauric diethanolamide, potentiates the activity of the above antimicrobial agents to a tremendous extent. However, the higher fatty acid diethanolamides do not potentiate the activity of all antimicrobial agents, and, in fact, negative results have been found by a combination of lauric diethanolamide with 9-aminoacridine and 3,4,4'-trichlorocarbanilide. However, with those antimicrobial agents whose action is potentiated by the presence of the higher fatty acid diethanolamide, particularly lauric diethanolamide, the potentiation is so remarkable, particularly in view of the relative inactivity of the lauric diethanolamide itself, that these antimicrobial agents can be put to much greater use than was previously possible.

The higher fatty acid diethanolamide may be mixed with the antimicrobial agent in greatly varying proportions. In general, amounts of 0.15 to 10 parts of the higher fatty acid diethanolamide per each part of the antimicrobial agent will give highly satisfactory potentiation of the activity of the antimicrobial agent for all purposes. The optimum concentration is about 1–3 parts of the higher fatty acid diethanolamide per each part of the antimicrobial agent.

Tests have been carried out to determine the degree of effectiveness of the diethanolamide of a higher fatty acid, such as lauric diethanolamide as a potentiating agent with the above mentioned known antimicrobial agents, namely sodium bithionolate, the zinc salt of 1-hydroxy - 2 - pyridinethione, hexachlorophene, and parachlorometaxylenol.

This was determined by carrying out tests to determine the antimicrobial activity of lauric diethanolamide alone, of each of the above mentioned antimicrobial agents alone, and of combinations of lauric diethanolamide with each of the antimicrobial agents mentioned above. The minimum inhibitory concentrations, that is the highest dilution which would how no growth of the test organism, was determined using *C. albicans* and *S. aureus* as the test organisms, was determined.

The procedure used to determine the antimicrobial activity was as follows:

The medium contained pancreatic digest of casein, 1.7%; dipotassium phosphate, 0.25%; dextrose, 0.25%. This was dissolved in distilled water and dispensed in 5 ml. amounts in metal capped culture tubes (150 x 18 mm.). The test solutions were made up and serially diluted through this medium. The tubes were then sterilized at 121° C. for 15 minutes and cooled to room temperature.

The test cultures were prepared by transferring the organism from an Agar slant to the above medium and incubating for 18 hours at 37° C. The cultures were centrifuged and washed with 0.9% saline twice. Following the final wash the cultures were resuspended in saline and diluted until there was 75% light transmission on the Spectronic 20 Colorimeter at a wavelength of 550 m$\mu$.

The standardized culture was then used to inoculate the tubes of test solution. Exactly 0.1 ml. of the culture suspension was transferred to each tube of test solutions in broth. The test organisms were *C. albicans* and *S. aureus*. Following inoculation of the solutions the tubes were incubated at 37° C. for 24 hours and observed for growth. The highest dilution tube showing no growth is reported as the minimum inhibitory concentration.

The results of the tests are summarized in Table 1 which follows:

TABLE 1

| Agents | Minimum inhibitory concentrations | |
|---|---|---|
|  | C. albicans | S. aureus |
| 1. Lauric diethanolamide | >1:250 | >1:250 |
| 2. Sodium bithionolate | 1:20,000 | 1:100,000 |
| 3. Sodium bithionolate (1 part) plus lauric diethanolamide (2.5 parts) (expressed as bithonolate) | 1:100,000 | 1:300,000 |
| 4. Vancide ZP (zinc salt of 1-hydroxy-2-pyridinethione) | 1:32,000 | 1:64,000 |
| 5. Vancide ZP (1 part) lauric diethanolamide (2.5 parts) (expressed as vancide ZP) | 1:64,000 | 1:128,000 |
| 6. Hexachlorophene | 1:32,000 | 1:32,000 |
| 7. Hexachlorophene (1 part) lauric diethanolamide (2.5 parts) (expressed as hexachlorophene) | 1:64,000 | 1:256,000 |
| 8. Parachlorometaxylenol (PCMX) | 1:16,000 | 1:16,000 |
| 9. PCMX (1 part) lauric diethanolamide (2.5 parts) | 1:64,000 | 1:64,000 |

Additional tests were carried out to illustrate the broad range of effective proportions from the standpoint of potentiation of the diethanolamide plus the antimicrobial agent, and these tests are summarized in Table 2 below:

TABLE 2

| Agents | Minimum inhibitory concentrations against C. albicans |
|---|---|
| 1. Sodium bithionolate (1 part) plus lauric diethanolamide (0.15 part) | 1:64,000 |
| 2. Lauric diethanolamide | >1:250 |
| 3. Sodium bithionolate | 1:20,000 |
| 4. Sodium bithionolate (1 part) plus lauric diethanolamide (0.5 part) | 1:80,000 |
| 5. Sodium bithionolate (1 part) plus lauric diethanolamide (1 part) | 1:80,000 |
| 6. Sodium bithionolate (1 part) plus lauric diethanolamide (1.25 parts) | 1:80,000 |
| 7. Sodium bithionolate (1 part) plus lauric diethanolamide (2.5 parts) | 1:80,000 |
| 8. Sodium bithionolate (1 part) plus lauric diethanolamide (5.0 parts) | 1:80,000 |
| 9. Sodium bithionolate (1 part) plus lauric diethanolamide (7.5 parts) | 1:80,000 |
| 10. Sodium bithionolate (1 part) plus lauric diethanolamide (10 parts) | 1:40,000 |

The following conclusions can be drawn from the above described tests:

Lauric dithanolamide must be considered as having no antimicrobial activity as against both C. albicans and S. aureus because of the high concentration (>1:250, in actuality betweeen about 1:100 and 1:200) required to prevent the growth of these microorganisms. Nevertheless, despite the ineffectiveness of lauric diethanolamide as an antimicrobial agent, when combined with the above mentioned antimicrobial agents it has the effect of increasing the antimicrobial activity of such agent by at least two-fold and by as much as five times.

Thus, whereas sodium bithionolate alone requires a minimum inhibitory concentration against C. albicans of 1:20,000, when sodium bithionolate is combined with lauric diethanolamide the minimum inhibitory concentration against C. albicans is increased five times to 1:100,000. A mere additive result would have meant that the minimum inhibitory concentration would have been about 1:20,250, which is substantially the same as sodium bithionolate alone.

DESCRIPTION OF PREFERRED EMBODIMENTS

The following examples are given to further illustrate the invention. The scope of the invention is not, however, meant to be limited to the specific details of these examples.

EXAMPLE 1

Antiseptic solution:                                Percent
  (1) Hexachlorophene _____ 1
  (2) Lauric diethanolamide _____ 1
  (3) 95% Ethyl Alcohol q.s. _____ 98

Procedure.—Dissolved the hexachlorophene and lauric diethanolamide in the 95% alcohol.

EXAMPLE 2

Antseptic solution:                                 Percent
  (1) Sodium bithionolate _____ 1.0
  (2) Lauric diethanolamide _____ 2.5
  (3) Citric acid _____ .4
  (4) Water, distilled _____ 96.1

Procedure.—Dissolved 1 and 2 in 90% of water and then add the citric acid dissolved in remaining water.

EXAMPLE 3—Shampoo

Part 1

| | | |
|---|---|---|
| 12% Sodium lauryl sulfate=Duponol QC (30%) | cc | 400,000 |
| 5% Lauric diethanolamide=Hyonic LA90 | gm | 50,000 |
| 1% Polyethylene glycol "600" distearate | do | 10,000 |
| 2% Polyoxyethylene lanolins=Lanogel 41 | do | 20,000 |

Part 2

Water, deionized q.s. ad. 950L

| | | |
|---|---|---|
| 2% Disodium 2,2'-thiobis(4,6-dichlorophenoxide)=sodium bithionolate=vancide BN (92%) | gm | 21,740 |
| Citric acid, granular (in solution) | do | 5,000 |

Part 3

0.3% Perfume oil _____ cc __ 3,000

Part 4

Water, deionized q.s. ad. 1000 L

Procedure.—Place together ingredients of Part 1 in kettle (S.S.) and warm sufficient (approx. 160° F.) to make a clear solution.

Add and dissolve ingredients of Part 2 in order.

Adjust to pH 7.0–7.3 using citric acid (approx. 400 gm.) in solution (and sodium hydroxide in solution, if necessary).

Allow to stand overnight to dissipate foam.

Add and blend ingredient of Part 3.

Filter through Ertel #1 asbestos pads and add Part 4 through filter.

Without further analysis, the foregoing will so fully reveal the gist of the present invention that others can, by applying knowledge available to those skilled in the art, modify the invention without, however, departing from the inventive concept. Such modifications are meant to be comprehended within the scope of the appended claims.

What is claimed is:

1. An antifungal and antibacterial composition comprising, as coactive ingredients, the diethanolamide of a higher saturated fatty acid selected from the group consisting of capric acid, lauric acid, palmitic acid, myristic acid and stearic acid, and an agent selected from the group consisting of sodium bithionolate, hexachlorophene and parachlorometaxylenol, the ratio of said diethanolamide to said agent being between about 0.15:1 and 10:1.

2. Composition according to claim 1 wherein said agent is sodium bithionolate.

3. An antifungal and antibacterial composition according to claim 1 wherein said diethanolamide is lauric diethanolamide.

4. Composition according to claim 1 wherein said agent is hexachlorophene.

5. Composition according to claim 1 wherein said diethanolamide is stearic diethanolamide.

6. Composition according to claim 1 wherein the diethanolamide is present in an amount of about 1 to 3 parts per each part of said agent.

7. Composition according to claim 1 wherein said agent is parachlorometaxylenol.

References Cited

UNITED STATES PATENTS

| 3,193,451 | 7/1965 | Reinisch | 424—320 |
| 3,235,455 | 2/1966 | Judge et al. | 424—263 |
| 3,250,794 | 5/1966 | Mod et al. | 424—320 X |

OTHER REFERENCES

Sagarin Cosmetics Science and Technology, 1957, pp. 403, 406, 408, and 560.

Chemical Week,, April 1955, pp. 72, 74 and 76.

Lewkowitsch, Chemical Technology and Analysis of Oils, Fats and Waxes, 1909, vol. I, p. 520.

ALBERT T. MEYERS, Primary Examiner

D. R. ORE, Assistant Examiner

U.S. Cl. X.R.

252—106; 424—263, 336